Figure 1:
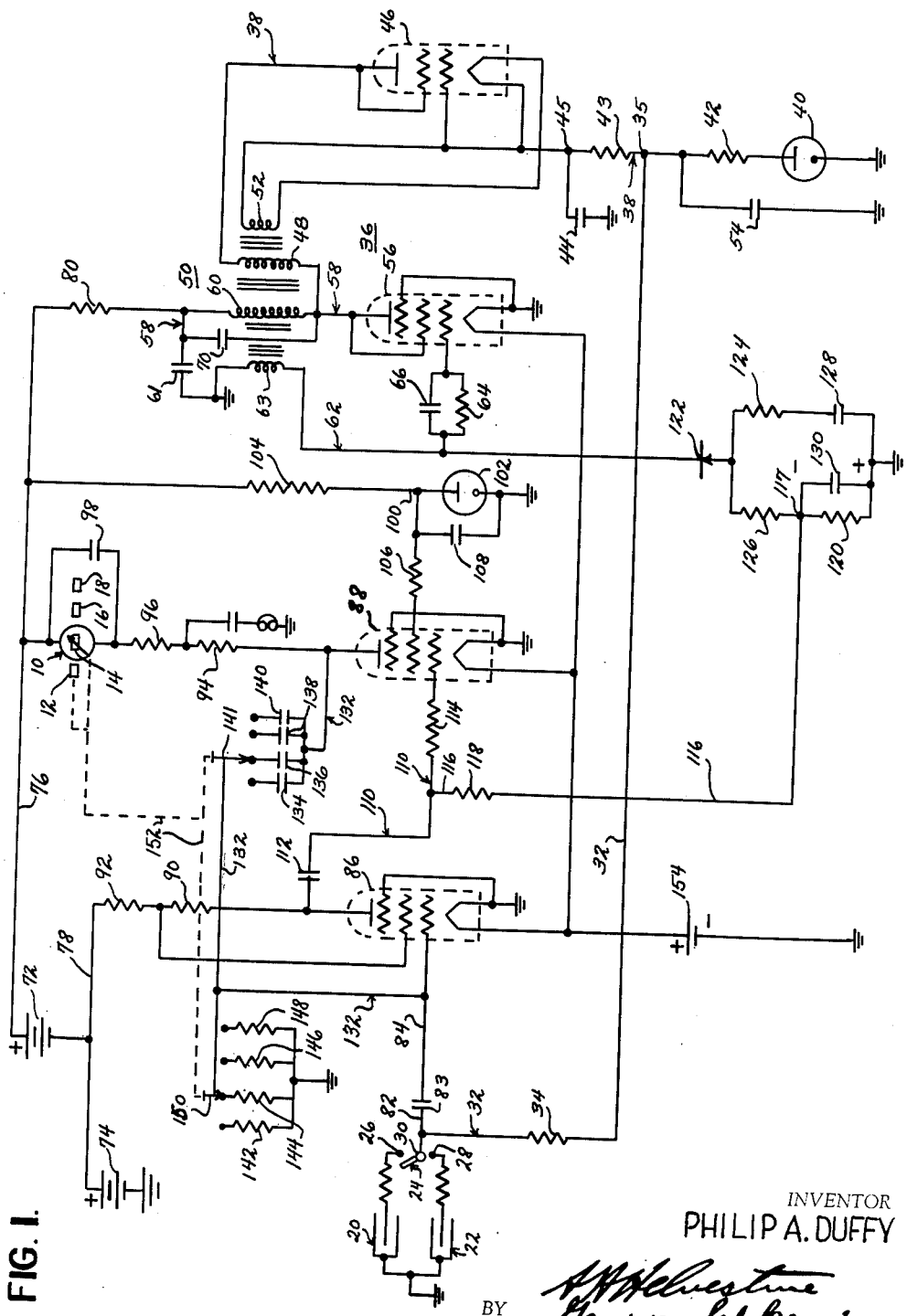

June 22, 1954

P. A. DUFFY 2,682,001

RADIATION MEASURING METER

Filed Aug. 2, 1951

2 Sheets-Sheet 1

FIG. I.

INVENTOR
PHILIP A. DUFFY

BY
ATTORNEYS

June 22, 1954     P. A. DUFFY     2,682,001
RADIATION MEASURING METER
Filed Aug. 2, 1951
2 Sheets-Sheet 2

INVENTOR
PHILIP A. DUFFY
BY *N. H. Helvestine*
*George Sipkin*
ATTORNEYS

Patented June 22, 1954

2,682,001

UNITED STATES PATENT OFFICE 2,682,001

RADIATION MEASURING METER

Philip A. Duffy, Baltimore, Md., assignor to the United States of America as represented by the Secretary of the Navy Application August 2, 1951, Serial No. 239,967

2 Claims. (Cl. 250—83.6)

This invention is directed to improvements in apparatus for detecting and quantitatively measuring radiations of a type produced by radioactivity, and particularly of gamma and beta radiation. Apparatus of this kind has become known as a "Radiac" set or meter.

A principal object of the invention is to provide dry-battery-energized apparatus of a type described for surveying a localized region for beta and gamma radiation, and for quantitatively indicating intensity of radiation in a range from a background intensity of substantially no radiation to an intensity well above the human-tolerance level which has been set at a maximum of .1 roentgen (r.) per day of gamma radiation or an equivalent amount of other external ionizing radiation.

An object of the invention is to provide apparatus of a type described utilizable as the essential component of a radiac set that is self-contained, rugged, light and portable, and is readily operated by non-technical persons.

A radiac set generally comprises a detector device that responds to radiation, and complementary equipment that converts or meters the response into a signal of some sort which is informative to the operator.

The radiation-responsive detector usually comprises one or more tubes such as, for example, Geiger tubes. As is known, such a tube, when suitably energized, provides a series of electrical pulses having a frequency that is a function of the intensity of the radiation which is received by the tube and to which it is operationally sensitive. These pulses, however, are of random width and random height. In accordance with the invention, a special converter-meter converts these pulses into D. C. pulses of constant width and constant height but having the same frequency as the pulses from the detector. The new pulses are used to provide a visual indication of an average of the pulses or an audible indication of the frequency of the pulses. Each of these indications is a measure of the radiation intensity.

The converter comprises a one-shot multi-vibrator for shaping and timing the incoming pulses from the detector and a meter-arrangement including an instrument having a scale on which an average intensity of the pulses is indicated. In order that the radiac set may have a wider range of usefulness, it is provided with adjustments giving it several ranges of operation with the same major component-parts.

Figure 2:
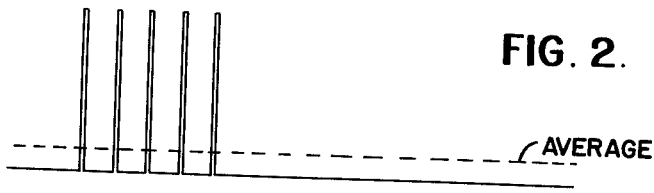
Figure 3:
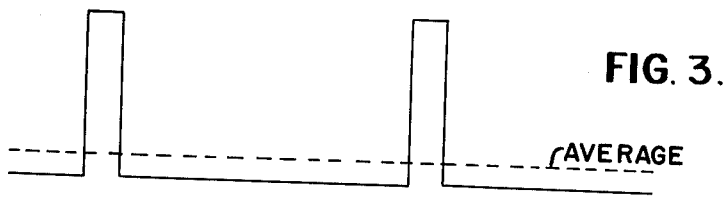
Figure 4:
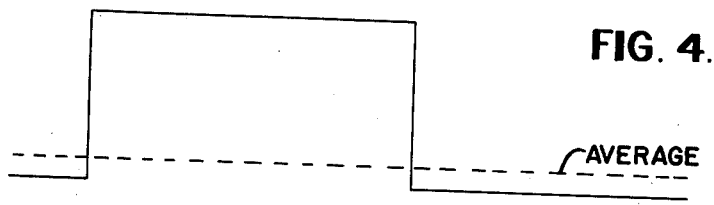

Objects, features and innovations of the invention, in addition to the foregoing, will be discernible from the following description and accompanying drawing of a specific embodiment thereof. In the drawing:

Fig. 1 is a simplified schematic wiring diagram of apparatus embodying the invention, and Figs. 2, 3 and 4 are curves for explaining the operation of the set under different adjustments or ranges, the ordinates being amplitude and the abscissae time of current-flow in the metering or measuring circuit.

Apparatus for a radiac set is shown schematically in Fig. 1 in an operating set-up for detecting gamma and beta radiation. It comprises an instrument 10 having a scale calibrated for indicating the intensity of the radiation. The instrument 10 preferably is a micro-ammeter having internal damping.

For greater utility, the instrument is provided with more than one scale, as for example with four scales 12, 14, 16 and 18 for the embodiment being described, each scale being calibrated for a different range of radiation-intensities.

For detecting the complete range of radiation-intensities for indication on the four scales, a pair of detector tubes 20 and 22 are provided. The tubes are preferably Geiger tubes of known design. One tube may be an end-window-type of high sensitivity mounted in a casing with a closable window for the detection of gamma and beta radiation, and the other may be a pencil type of medium sensitivity for measuring gamma radiation only.

The tubes 20 and 22 are selectively rendered operable in the apparatus by any suitable equipment, indicated in Fig. 1 as a switch 24 having contacts 26 and 28 optionally engageable by a manually operated switch-blade pivoted at a pivot 30. The contacts 26 and 28 are connected to the insulated high voltage electrodes of the Geiger tubes 20 and 22, respectively, through resistors that have high resistances for pulse-quenching and surge-limiting purposes in accordance with known practice.

High potential in the order of 700 volts D. C. is supplied to the pivot 30 and hence to either of the high-voltage electrodes of the tubes 20 and 22, through a signal-establishing circuit-branch 32 that includes a load resistor 34. The circuit-branch 32 connects to a point 35 of a high-voltage generating and rectifier means that is similar to that used in television sets. This high voltage D. C. supply means is indicated in its entirety by the reference numeral 36 and comprises a rectifier circuit 38 that includes the point 35.

The rectifier circuit 38 also comprises a voltage regulator corona tube 40, a comparatively low resistance resistor 42, the point 35, and a high-resistance resistor 43 connected in series. These series-connected elements are connected as a whole in parallel with a capacitor 44 between ground and a point 45. From point 45, the rectifier circuit 38 comprises the anode-cathode circuit of an electronic tube 46 and a secondary winding 48 of a multi-winding reaction-type transformer 50. The tube 46 may be a shield grid type of tube, such as, for example, an electrometer tube CK571AX connected as a rectifier. The filament of the tube 46 is energized from a separate winding 52 on the transformer 50. The resistors 42 and 43 and a capacitor 54 also help to smooth the rectified voltage supply.

The high voltage D. C. supply means 36 also comprises a generator in the form of a vacuum tube oscillator. The oscillator comprises an electronic tube 56, for example, a pentode CK522, having an A. C. cathode-anode circuit 58 including a primary winding 60 of the transformer 50, and a by-pass capacitor 61, and comprises a main grid-circuit 62 including a feed-back winding 63 of the transformer 58 and parallelly-connected grid-biasing resistor 64 and capacitor 66. A .001 mfd. capacitor 70 is connected across the primary winding 60 for suppressing parasitic oscillations in the transformer 50.

The D. C. energy supply for the plate circuit of the tube 56 comprises a pair of additively series-connected D. C. sources 72 and 74, the positive high potential sides of which are connected to conductors 76 and 78 respectively. In the specific embodiment being described, to which the invention is not limited, dry batteries of 180 volts and 30 volts, respectively, can be used. During operation of the oscillator means 36, the capacitor 61 and a resistor 80 also help to limit modulation of battery voltage, especially as the internal resistance of the batteries increases with age.

The Geiger tube pulses are fed from the switch terminal 30 to a one-shot multi-vibrator through a conductor 82, to which the circuit branch 32 is connected, a coupling capacitor 83 and a conductor 84. The multi-vibrator comprises a pair of electronic tubes 86 and 88 which may be of the CK522 type. With no pulses in the connected Geiger tube, the tube 86 is normally conducting and the tube 88 is normally non-conducting or cut-off. To this end the anode of the tube 86 is connected to the voltage-supplying conductor 78 through a load resistor 90 and a voltage-dropping resistor 92; and the anode of the tube 88 is connected to the voltage-supplying conductor 76 through a load resistor 94, an audible signal resistor 96 and the instrument 10. A smoothing capacitor 98 is connected across the instrument 10. The resistor 92 is a voltage-dropping resistor for the screen grid of tube 86; and the screen grid of the tube 88 is potentialized through a voltage supplying and regulating circuit 100 comprising a gas voltage-regulating glow tube 102 and resistor 104 that is connected to the conductor 76. The resistor 104 drops the voltage for application to the screen-grid; and a resistor 106 and a capacitor 108 filter and maintain it.

The control grid of the tube 88 is coupled to the anode of the tube 86 through a circuit 110 comprising a coupling capacitor 112 and a current limiting resistor 114. The circuit 110 has a circuit 116 connected thereto at the grid side of the capacitor 112. The circuit 116 extends to a point 117 and includes an input signal resistor 118 and a bleeder resistor 120. The circuit 116 is biased by voltage obtained from grid circuit 62 of oscillator tube 56. To this end a rectifier 122 is connected to the circuit 62 and feeds into smoothing and current-limiting filter-circuit elements comprising resistors 124 and 126 and capacitors 128 and 130.

In accordance with the invention, the anode of the tube 88 is connected to the control grid of the tube 86 through a circuit 132 that comprises a selected one of a plurality of coupling capacitors 134, 136, 138 and 140, of different capacitances. The circuit 132 contains a movable contact-arm 141 for selecting a capacitor for use in the circuit. Leak-off resistors 142, 144, 146 and 148, of different resistances, are respectively associated with the capacitors 134, 136, 138 and 140 through a movable contact-arm 150. The contact-arms 141 and 150 are mechanically interconnected so as to move simultaneously, and preferably are also interconnected with the scales 12, 14, 16 and 18 of the instrument 10. The mechanical interconnection is indicated in Fig. 1 by the broken lines 152.

The cathodes of the tubes 86 and 88 are energized through a D. C. source 154 which may be a 1.5 volt dry battery.

It is apparent that the equipment can be considered to comprise four primary elements, namely, the radiation sensitive means comprising the Geiger tubes 20 and 22, the metering or the pulse shaping means comprising the multi-vibrator including tubes 86 and 88, the pulse-measuring means comprising the instrument 10, and the D. C. voltage supplying means 36. The D. C. voltage supplying means makes available D. C. biasing voltages at points 35 and 117 for the circuits 32 and 116 respectively.

For an understanding of the operation of the voltage-supplying means, it is well to bear in mind that the transformer 50 is of the reaction type, and that the high voltage is generated as high-amplitude pulses resulting from the rapid decay of magnetic flux in the transformer core.

The oscillator circuit including the tube 56 and the transformer 50 is of the feedback type. The feedback voltage applied to the control grid of the tube 56 is sufficient during conduction to saturate the tube. This causes limitation of plate current after a time, and reduces the rate of change to zero. The induced voltage established during conduction begins to collapse. The induced feedback voltage goes negative, causing plate current cut-off. The collapsing magnetic field induces a high voltage peak which is applied to capacitor 44. The capacitor-voltage is smoothed by resistors 42 and 43 and capacitor 54, so that, with the action of corona tube 40, a suitable D. C. voltage is obtained at point 35. Capacitor 66 and resistor 64 provide negative grid bias for the tube 56 which varies during the life of dry-cell batteries for the sources 72 and 74 in such a way as to stabilize the output of the oscillator.

Negative bias for the tube 88 is obtained from the voltage supplied by winding 63 which is rectified by rectifier 122 and smoothed by filter elements comprising resistors 124 and 126 and capacitor 128.

Operation

In normal operating "stand-by" condition of the equipment, the tube 86 of the multi-vibrator is conducting; and the tube 88 of the multivibrator is not conducting; that is, cut off.

As is known to the art, incoming radiation on the Geiger tube 20 or 22, depending on which is in use, is converted to random pulses at a rate indicative of the intensity of radiation; and when a negative pulse is supplied to the resistor 34, the tube 86 is driven to cut-off whereupon the tube 88 starts to conduct. Conduction in tube 88 applies a bias to the tubes 86 and 88 tending to restore conduction in tube 86 and cut-off of tube 88. During the time-interval of conduction of tube 88 a predetermined pulse is produced of corresponding duration. Consequently, each pulse from a Geiger tube establishes a signal pulse on the resistor 34. This signal pulse is converted into a measurable pulse by the multivibrator.

The conduction time of tube 88 is determined by the RC constants of the positive feedback loop connecting the plate of tube 88 to the grid of the tube 86. This loop comprises the circuit 132 which includes one of the capacitors 134, 136, 138 and 140 and one of the complementary resistors 142, 144, 146 and 148. The pulse-length, which corresponds to the conduction time, is measured by the current flow in the plate circuit of the tube 88; this plate circuit comprising conductor 76, instrument 10 and resistors 94 and 96.

In order to have the same maximum deflection in the instrument 10 for maximum indications in each of the four ranges selected, the pulse length for whatever range is selected should satisfy the equation $$D = Kf(RC)$$

where D is full scale deflection of the instrument 10 measured in microamperes; K is a constant which depends on the equipment used; f is the pulse rate and is proportional to the maximum intensity of radiation on the scale-range selected; and RC is the factor determining pulse length, and is the product of the resistance in ohms of the particular resistor 142, 144, 146, or 148 actually fully connected in the feedback circuit, with the capacitance in farads of the particular capacitor 134, 136, 138 or 140 associated with said particular resistor. This maintains the same average current through the instrument for a given deflection, on any one of the four ranges.

The transition of the random pulses of the Geiger tubes to regular pulses for measuring is indicated in Figs. 2, 3 and 4 for pulse rates of 2000, 200 and 20 per second respectively, providing pulse periods of .0005, .005, and .05 second respectively for maximum deflections in three different ranges. In each instance the pulses have the same amplitude; and the same average metering current flow is obtained in the plate circuit of the tube 88 with pulse lengths of 25, 250 and 2500 microseconds. Thus, assuming a pulse amplitude of one milliampere, an average current flow of 50 microamperes obtains in each range for maximum pulse-rate for that range. The magnitude of current flow drops with lower pulse rates.

From Figs. 2, 3 and 4, it is apparent that in addition to the tube 88 of the multivibrator functioning as a pulse shaper for fixing pulse duration, it must function as an integrating amplifier for regulating the current pulse amplitude. To obtain this performance, the screen grid of tube 88 is kept at constant potential by means of a neon voltage regulator circuit comprising the glow tube 102. In the specific embodiment hereinbefore occasionally referred to, this maintenance-voltage can be approximately 68 volts. A large filter capacitor 108 is connected across the tube 102 to avoid extinction of the flow in the glow tube during pulses of screen conduction. Resistor 104 should have a resistance low enough to avoid relaxation oscillations.

A further regulatory provision is the operation of tube 88 at the upper limit of the flat portion of the plate characteristic. This makes the tube relatively insensitive to decaying plate voltage over the life of the dry batteries used to energize the equipment. Additionally, tube 88 should be made insensitive to variation in plate voltage supplied to tube 86 of the multivibrator. This can be done by making the pulse coupled from the plate of tube 86 to the grid of tube 88 of sufficient amplitude to drive tube 88 to saturation or the grid conduction region. The coupling is through circuit 110; and resistor 114 of this circuit limits the grid current, so as to maintain a constant input regardless of some variation of plate voltage on tube 86.

By providing an extremely short resolving time in the rate measuring circuit including the instrument 10 and the cathode-plate circuit of tube 88, a high degree of accuracy is obtained. The instrument 10 is damped by capacitor 98 to smooth the pulsating plate current of the tube 88, particularly on the most sensitive ranges where long conduction time is required because of low pulse rate.

In the specific form referred to, for full scale deflection on instrument 10, the ratio of conduction time to off time on all scales is approximately 1 to 20. This was obtained with resistors 104, 106, 114 and 118 of .39 meg., .1 meg., .1 meg. and 1 meg., respectively; and capacitor 112 of .01 microfarad.

The particular operating range is selected by operation of the switches 24, 141, 150, and the use of the proper Geiger tube for the range. In an actual embodiment, the switches 141 and 150 were mechanically interconnected, as represented at 152, so as to be movable in unison, thereby keeping the resistors 134, 136, 138 and 140 properly paired with the capacitors 142, 144, 146 and 148. In addition, the connection 152 changed the scale of the instrument 10 so as to read the radiation intensity directly, without the need of a correction or multiplication factor.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A radiation-intensity measuring means comprising a plurality of sensitive means for producing pulses at a rate corresponding to the intensity of radiation, said sensitive means each comprising a pulse-quenching means and a signal-establishing circuit for establishing signal pulses in response to the first said pulses, pulse forming means comprising a pair of multi-element electronic tubes each having at least a control grid and an anode and having coupling circuits connected between the control grid of one of said electronic tubes and the anode of the second electronic tube for generating pulses of uniform width in response to said signal pulses, means for selectively connecting one of said sensitive means to the control grid of a first of said electronic tubes, a plurality of pairs of time-constant electrical elements comprising serially connectable resistors and capacitors, switch means for selectively connecting a selected pair of said time-constant electrical elements in said coupling circuit associated with the control grid of said first electronic tube and the anode of the second of said pair of electronic tubes, control means for maintaining said last named pulses at a constant amplitude comprising a voltage-regulator tube connected to the screen grid of said second tube, instrument means connected to the anode of said second tube for indicating the average current therethrough, said instrument comprising a microammeter having a plurality of interchangeable scales each calibrated for a different range of radiation intensities, and switching means for selectively inserting a selected one of said scales on the instrument, said last mentioned switching means being mechanically connected with said switch means associated with said time-constant elements for unitary operation therewith.

2. A radiation-intensity measuring means comprising a plurality of sensitive means for producing random-width, random-height pulses at a rate corresponding to intensity of radiation, generating means for applying a high voltage to the sensitive means, pulse-quenching means in series with each of said sensitive means, a multi-vibrator comprising a pair of multi-element electronic tubes each having at least a control grid and an anode and having coupling circuits connected between the control grid of the first of said electronic tubes and the anode of the second of said electronic tubes for generating pulses of uniform height and uniform width in response to said first named pulses, switch means for selectively connecting one of said sensitive means to the control grid of a first of said electronic tubes, a plurality of pairs of time-constant electrical elements each comprising serially connectable resistors and capacitors, switch means for selectively connecting any one pair of said time-constant electrical elements in a coupling circuit associated with the control grid of said first tube and the anode of the second of said pair of tubes, means for biasing the second tube for operation at saturation including a separate rectifier located in a circuit between the control grid of said second tube and said generating means, control means for maintaining said generated pulses at a constant amplitude comprising a voltage-regulator tube connected to the screen grid of said second tube, instrument means for indicating the average recurrence rate of said generated pulses connected to the anode of said second tube, said instrument comprising a microammeter having a plurality of interchangeable scales each calibrated for a different range of radiation-intensities, and switching means for selectively inserting the proper scale on the instrument to correspond with the pair of time-constant elements then in the circuit, said last mentioned switching means being mechanically coupled with said switch means associated with the time-constant elements for unitary operation therewith.

References Cited in the file of this patent

UNITED STATES PATENTS

| Number | Name | Date |
|---|---|---|
| 2,383,478 | Friedman et al. | Aug. 28, 1945 |
| 2,405,572 | Friedman | Aug. 13, 1946 |
| 2,418,892 | Lord, Jr. | Apr. 15, 1947 |
| 2,462,140 | Spicer | Feb. 22, 1949 |
| 2,503,730 | Hare | Apr. 11, 1950 |